(12) United States Patent
Howroyd et al.

(10) Patent No.: US 10,155,498 B2
(45) Date of Patent: Dec. 18, 2018

(54) REMOTE VEHICLE DISABLING SYSTEM AND METHOD

(71) Applicants: Frederick Howroyd, Brackenfell Cape Town (ZA); Elsie Howroyd, Brackenfell Cape Town (ZA)

(72) Inventors: Frederick Howroyd, Brackenfell Cape Town (ZA); Elsie Howroyd, Brackenfell Cape Town (ZA)

(*) Notice: Subject to any disclaimer, the term of this patent is extended or adjusted under 35 U.S.C. 154(b) by 8 days.

(21) Appl. No.: 15/229,948

(22) Filed: Aug. 5, 2016

(65) Prior Publication Data

US 2017/0036644 A1 Feb. 9, 2017

Related U.S. Application Data

(60) Provisional application No. 62/201,131, filed on Aug. 5, 2015.

(51) Int. Cl.
*B60R 25/04* (2013.01)
*B60R 25/042* (2013.01)
*B60R 25/20* (2013.01)
*B60R 25/10* (2013.01)

(52) U.S. Cl.
CPC ............ *B60R 25/04* (2013.01); *B60R 25/042* (2013.01); *B60R 25/209* (2013.01); *B60R 2025/0415* (2013.01); *B60R 2025/1013* (2013.01); *B60R 2325/205* (2013.01)

(58) Field of Classification Search
CPC ..... B60R 25/04; B60R 25/042; B60R 25/209; B60R 2025/0415; B60R 2025/1013; B60R 2025/205

USPC ............................................................ 701/2
See application file for complete search history.

(56) References Cited

U.S. PATENT DOCUMENTS

| | | | | |
|---|---|---|---|---|
| 4,832,146 A * | 5/1989 | Luby | ................ | B60R 25/04 180/287 |
| 5,224,567 A * | 7/1993 | Tomlinson | .............. | B60R 25/04 180/287 |
| 5,276,728 A * | 1/1994 | Pagliaroli | ............... | B60R 25/04 180/287 |
| 5,449,957 A * | 9/1995 | Carlo | ...................... | B60R 25/04 180/287 |
| 5,652,564 A * | 7/1997 | Winbush | ................. | B60R 25/04 307/10.3 |
| 5,729,192 A * | 3/1998 | Badger | ................... | B60R 25/04 307/10.2 |
| 5,805,057 A | 9/1998 | Eslaminovin | | |

(Continued)

*Primary Examiner* — Krishnan Ramesh
(74) *Attorney, Agent, or Firm* — Global Intellectual Property Agency, LLC; Daniel Boudwin

(57) ABSTRACT

A remote vehicle disabling system and method. The remote vehicle disabling system includes a master unit in communication with a slave unit. The slave unit is operably connected to a vehicle and one or more operational components of the vehicle. The slave unit can activate or deactivate the operational component and immobilize the vehicle. If the slave unit needs to be overridden, an override switch may be actuated to provide electrical power to the operational components, which form an operational group. The slave unit and master unit are in periodic communication with each other. If the time between communication between the units exceeds a certain amount of time, then the operational component disables the vehicle.

8 Claims, 5 Drawing Sheets

(56) References Cited

U.S. PATENT DOCUMENTS

| | | | | |
|---|---|---|---|---|
| 6,011,321 | A * | 1/2000 | Stancu | B60R 25/04 |
| | | | | 180/287 |
| 6,026,922 | A * | 2/2000 | Horton | B60R 25/04 |
| | | | | 180/287 |
| 6,232,884 | B1 | 5/2001 | Gabbard | |
| 6,505,101 | B1 | 1/2003 | Brill | |
| 7,088,219 | B2 | 8/2006 | Dawson et al. | |
| 7,545,258 | B2 * | 6/2009 | Endo | B60R 25/042 |
| | | | | 340/426.11 |
| 2003/0006886 | A1 * | 1/2003 | Gabbard | B60R 25/04 |
| | | | | 340/425.5 |
| 2005/0263120 | A1 * | 12/2005 | Fifelski | B60R 25/209 |
| | | | | 123/179.2 |
| 2007/0279283 | A1 * | 12/2007 | Flick | B60R 25/04 |
| | | | | 342/357.31 |
| 2015/0298653 | A1 * | 10/2015 | Schwartz | B60R 25/045 |
| | | | | 701/2 |

* cited by examiner

REMOTE VEHICLE DISABLING SYSTEM AND METHOD

CROSS REFERENCE TO RELATED APPLICATION

This application claims the benefit of U.S. Provisional Application No. 62/201,131 filed on Aug. 5, 2015. The above identified patent application is herein incorporated by reference in its entirety to provide continuity of disclosure.

BACKGROUND OF THE INVENTION

The present invention relates to a vehicle immobilizing system and method of using the same. More specifically, the present invention relates to a vehicle immobilizing system and method comprising a master and slave unit configured for wireless communication therebetween, wherein the slave unit is operably connected to operational components of a vehicle, such that, upon receiving a kill command from the master unit, the command causes the slave unit to shut down or change the state of the operational components.

Many people, especially persons living and working in high crime areas, must park or otherwise leave their vehicle unattended for long periods of time. In recent years, the theft of vehicles has continued to rise and have reached an estimated $4.3 billion in the United States alone. When a vehicle is stolen the financial cost is significant, but the psychological effect on the driver can be devastating, creating a sense of insecurity and fear. This is especially true in circumstances where the driver is ordered out of their vehicle under die threat of violence.

Some attempts have been made by vehicle manufactures and after-market producers to provide systems to mitigate these legitimate concerns of vehicle owners. However, these systems have several significant deficiencies such as requiring activation from a remote device with limited range, being easily disabled, and detracting from the proper functionality of the vehicle. For example, the ignition system of a vehicle's engine often includes an ignition switch in electrical communication with the positive terminal of an on-board a battery and with a sparkplug, that is in turn in electrical communication the negative terminal of the battery. As a user attempts to activate the vehicle engine, the ignition switch closes the circuit of the ignition system, causing the sparkplug to activate and the engine to activate. The previous attempts to disconnect the engine from the battery utilized wiring that risks draining the battery of electrical power. Further, the previous attempts require line of sight and fail to utilize wireless telecommunications networks for communicating. Additionally, the previous attempts fail to provide multiple disabling operational components of the vehicle simultaneously.

In one example, the present invention provides a kill mechanism, such as a bypass switch, that breaks the connection between the positive terminal of the ignition system, thereby preventing the unnecessary draining of electric energy from the battery. Also, the present invention renders many critical operational components necessary for the proper functioning of the vehicle. This can occur while the vehicle is in motion, slowly bringing the vehicle to a stop, or by preventing the vehicle from activating. The shutting down of one or more than one of these operational components makes identifying and tampering with the current system by an unauthorized user near impossible.

The present invention provides a master and slave unit configured to wirelessly communicate to each other via a wireless network, such as a telecommunications network, wherein the slave unit is operably connected to operational components of a vehicle. In one embodiment, the master unit comprises a trigger unit, wherein the trigger unit is an electronic device. Upon receiving a kill command from the trigger unit, the slave unit can shut down or change the state of the operational components. Additionally, the present invention also can bring attention to the vehicle by activating sound and light producing devices, such as a horn and lights. Further, the present invention may change the state of the locking mechanisms of the doors of the vehicle.

In light of the devices disclosed in the prior art, it is submitted that the present invention substantially diverges in design elements from the prior art and consequently it is clear that there is a need in the art for an improvement to remote vehicle disabling systems and methods of using the same. In this regard the instant invention substantially fulfills these needs.

SUMMARY OF THE INVENTION

In view of the foregoing disadvantages inherent in the known types of remote vehicle disabling systems and methods now present in the prior art, the present invention provides a remote vehicle disabling system and method that utilizes a master unit and slave unit configured for wireless communication therebetween, wherein the slave unit is operably connected to operational components of a vehicle, such that upon receiving a kill command from the master unit causes the slave unit to shut down or change the state of the operational components.

It is therefore an object of the present invention to provide a new and improved remote vehicle disabling system and method that has all of the advantages of the prior art and none of the disadvantages.

The present invention relates to a remote vehicle disabling system and method comprising a slave unit in wireless communication to a master unit, wherein the slave unit is operably connected to certain operational components of a vehicle. The operational components may be activated or deactivated by the slave unit upon receiving a command from the trigger unit. Further, the slave unit is in periodic communication with the master unit, wherein if the communication therebetween exceeds a certain time, then the slave unit causes the operational components to immobilize the vehicle or alert the surrounding area.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
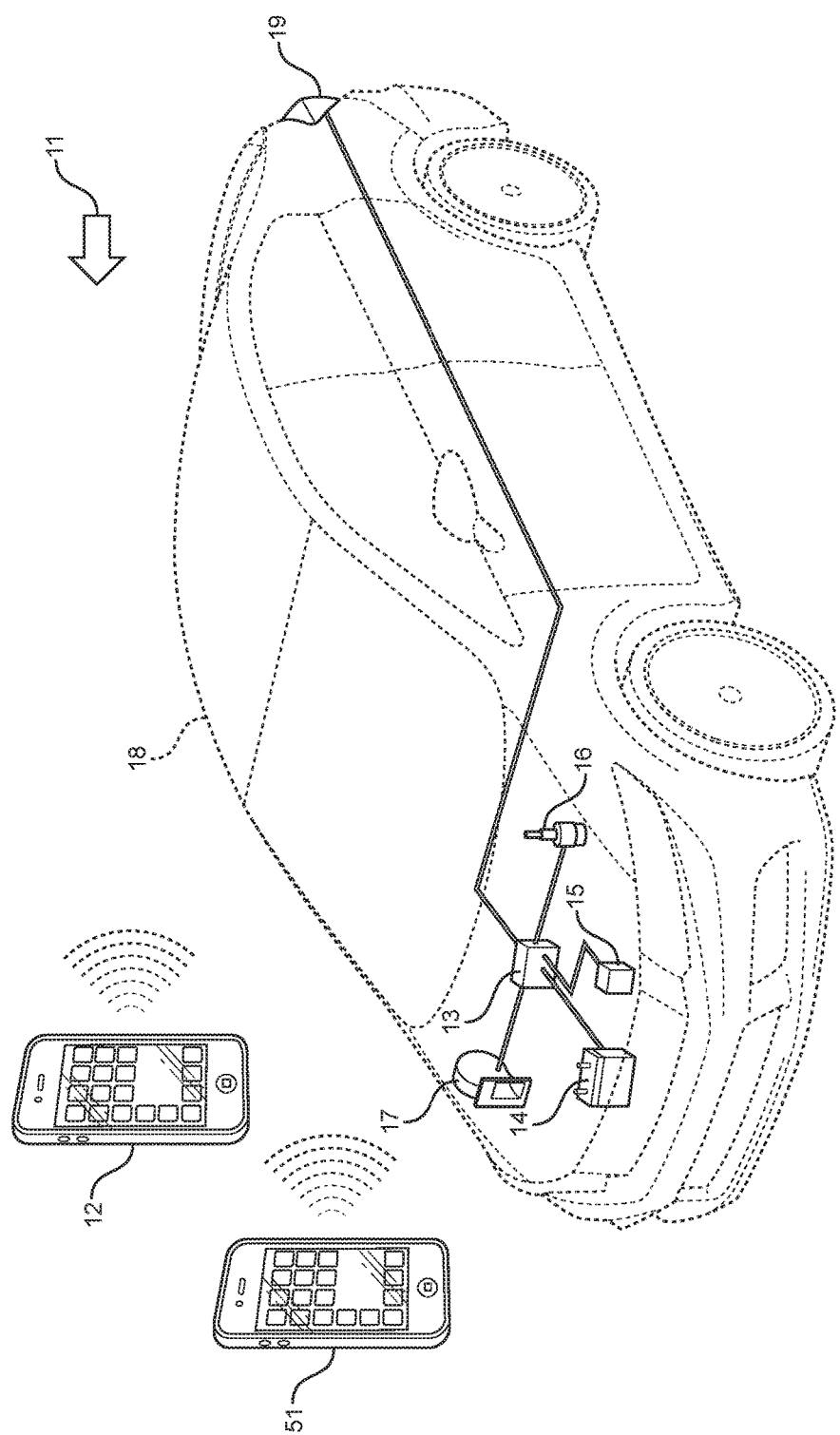
FIG. 1 shows a schematic view of one embodiment of the overall system of the present invention.

Reference is made herein to the attached drawings. Like reference numerals are used throughout the drawings to depict like or similar elements of the remote vehicle disabling system and method. For the purposes of presenting a brief and clear description of the present invention, the preferred embodiment will be discussed as used for providing a way of disabling certain operational components of a vehicle and actuating non-critical components of the vehicle in the event of vehicular theft. The figures are intended for representative purposes only and should not be considered to be limiting in any respect.

Referring now to FIG. 1, there is shown a schematic view of one embodiment of the overall system of the present invention. The present invention provides a remote vehicle disabling system 11 comprising a slave unit 13 configured to receive instructions from a trigger unit 12 via a wireless communication network. The trigger unit 12 may be an electronic device, such as a mobile cellular phone. As such, the wireless communication network includes telecommunications networks, internet networks, and the like. The slave unit 13 is operably connectable to an operational component of a vehicle, wherein the slave unit 13 is configured to change a state of the operational component. The operational component of a vehicle is selected from the following group consisting of a fuel valve 15, an ignition system 14, an engine starter 16, a door locking system 18, a horn system 17, and a light system 19. The engine starter 16 includes a starter motor configured to control the activation of a vehicle's engine. The fuel valve 15 includes a solenoid valve configured to regulate fuel to an engine of the vehicle. An example of changes the state of the operational component includes one of an embodiment, wherein the slave unit is configured to change the state of the fuel valve 15 between an operational state that provides proper regulation of fuel to a working engine, and inoperable state that causes the engine to shut down.

In the shown embodiment, a master unit 51 is an electronic device in wireless communication with the slave unit 13. The master unit 51 preferably monitors the slave unit 13 and regularly maintains a wireless connection therewith. For example, the master unit 51 may be a server that provide software updates, and the like to the slave unit 13, and the trigger unit 12 may be separate electronic device. In an alternative embodiment, the master unit 51 comprises a trigger unit 12. Henceforth, "master unit" encompasses master unit 51 and trigger unit 12.

The slave unit 13 comprises a memory, a processor, and a logic stored in the memory that, when executed by the processor, causes the slave unit 13 to perform a method comprising the steps of: receiving a command from the master unit 51; changing the state of the operational component via actuating the slave unit 13 upon receipt of the command; and transmitting a confirmation message to the master unit 51 upon changing the state of the operational component of the vehicle.

Figure 2:
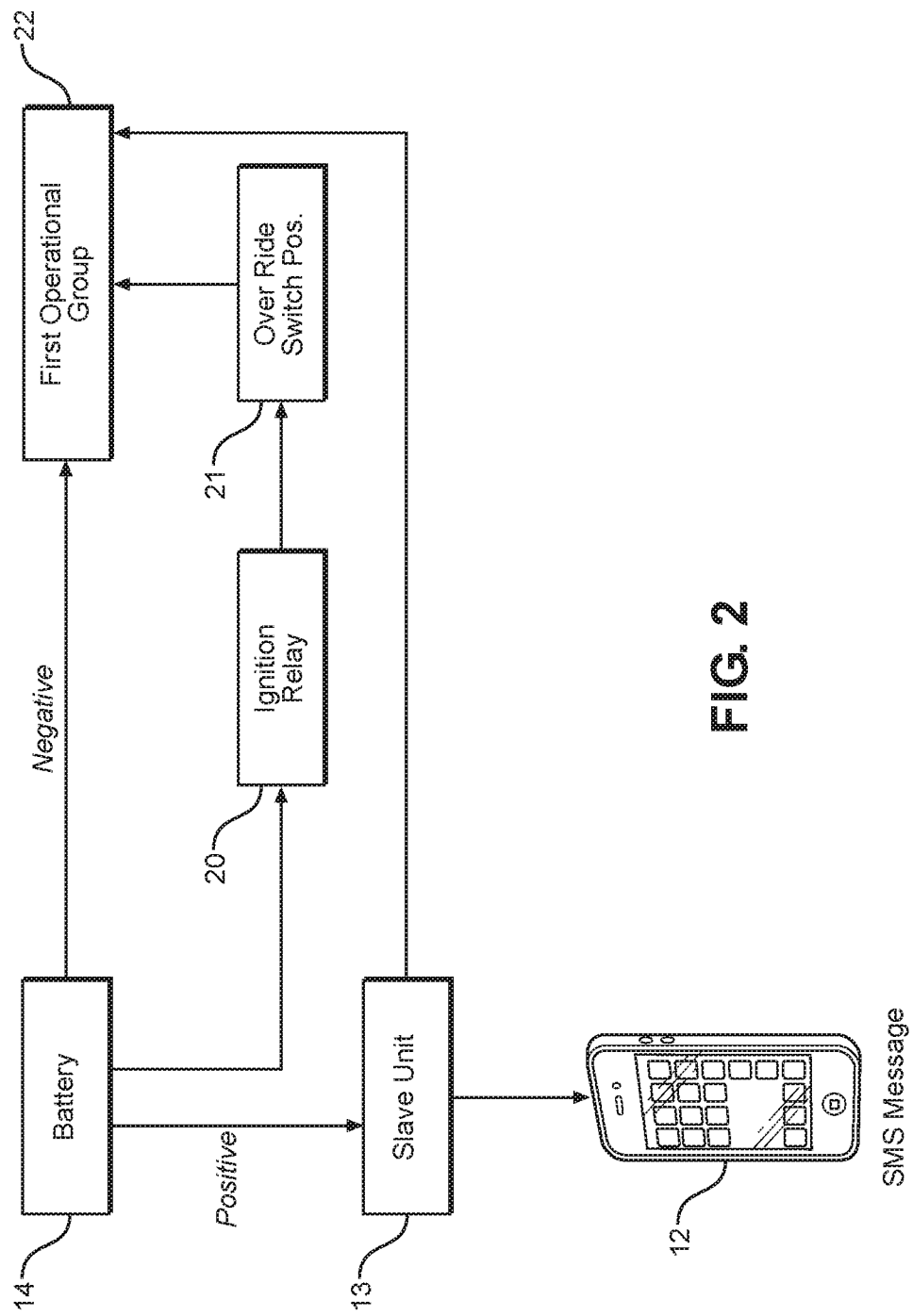
FIG. 2 shows a schematic view of one embodiment of the first operational group of the present invention.
Figure 3:
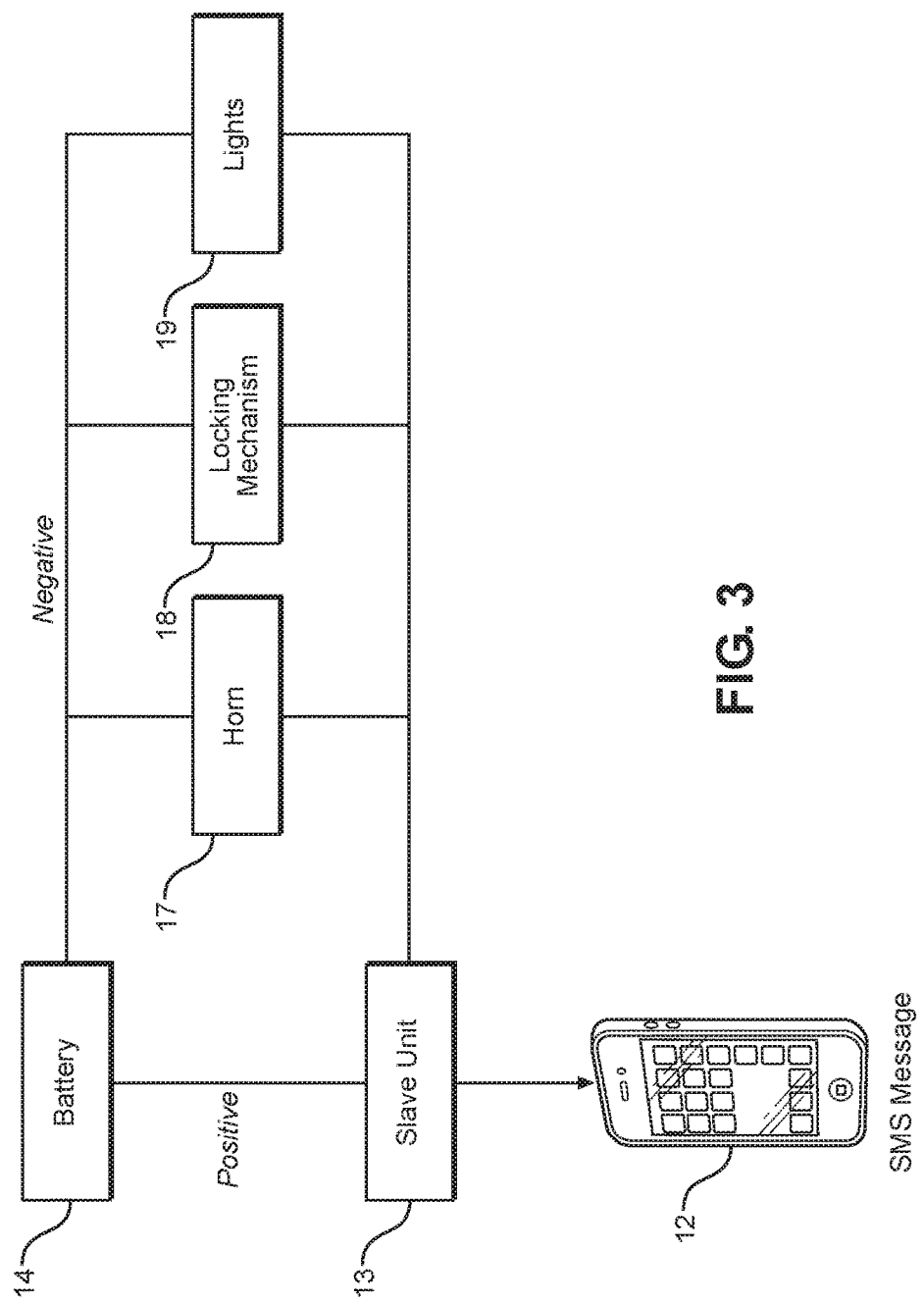
FIG. 3 shows a schematic view of one embodiment of the second operational group of the present invention.

Referring now to FIGS. 2 and 3, there is shown a schematic view of one embodiment of the first operational group of the present invention and there is shown a schematic view of the second operational group of the present invention, respectfully. The operational components of a vehicle comprise a first operational group 22 and a second operational group, wherein the first operational group 22 includes the fuel valve 15, the ignition system 14, and the engine starter 16. The second operational group includes the door locking system 18, the horn system 17, and the light system 19. The door locking system 18 includes a locking mechanism operably connected to at least one door of the vehicle, wherein the locking mechanism is configured to control the opening and closing of that door. The horn system 17 includes a sound making device operably connected to the vehicle. The light system 19 include one or more lights operably connected to the vehicle.

In the shown schematic view, the members of the first operational group 22 are operably connected to the ignition system of the vehicle 14, including a battery, and the slave unit 13. In the shown embodiment, a backup electrical connection including the ignition relay switch 20 and an override switch 21 may be operably connected to the first operational group 22 via the positive terminal of the battery 14. Under normal operation, the backup electrical connection does not provide electrical power to the first operational group 22. Electrical power is provided via the slave unit 13. However, if the slave unit 13 needs to be overridden, the override switch 21 may be actuated to provide electrical power to the first operational group 22.

In one embodiment, at least one of the operational components is electrically connected to the negative terminal of a power source and an ignition relay switch 20 is electrically connected to the positive terminal of the power source 14 and operably connected to the slave unit 13. A bypass switch/override switch 21 is operably connected to the slave unit 13, wherein the override switch 21 is configured to override the slave unit and allow activation of at least one of the operational components. In another embodiment, at least one of the operational components is electrically connected to the positive terminal of a power source and the starter 16 is electrically connected to the negative terminal of the power source 14 and operably connected to the slave unit 13. An override switch 21 is operably connected to the slave unit 13, wherein the override switch 21 is configured to override the slave unit and allow activation of at least one of the operational components The slave unit 13 controls the state of the first operational group 22 and the second operational group by providing or breaking electrical power thereto. In one embodiment, the slave unit 13 includes electrical switches that physically break the electrical circuit to the first operational group 22. For example, in one embodiment the slave unit is configured to change the state of the engine starter 16 between an operational state that provides electrical power to the sparkplugs and/or engine, and an inoperable state that causes the engine to shut down. In another embodiment, the fuel valve 15 is wired through the ignition relay 20 to prevent the battery 14 from draining of electrical energy quickly.

Figure 4:
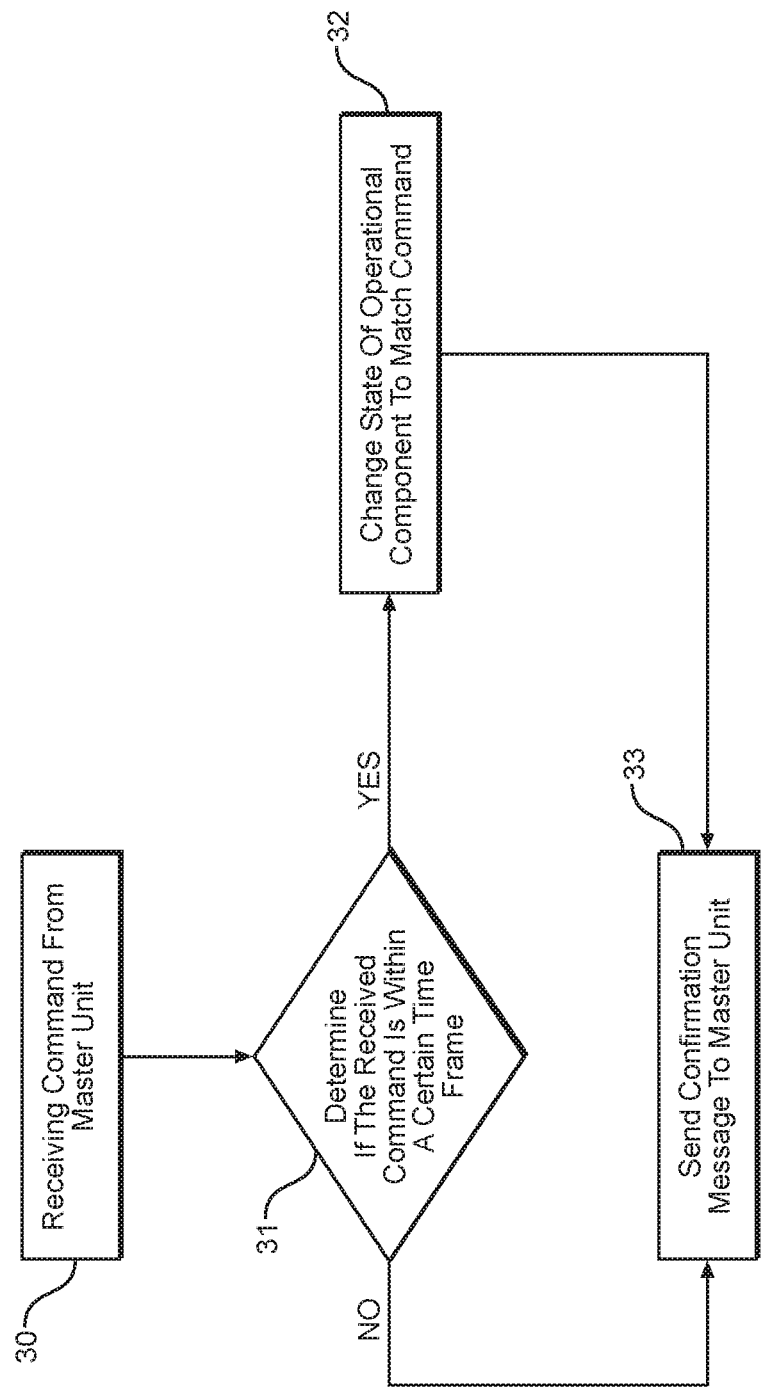
FIG. 4 shows a flowchart of the method of use of an illustrative embodiment of the present system.

Referring now to FIG. 4, there is shown a flowchart of the method of use of an illustrative embodiment of the present system. In the illustrative embodiment of a method, the slave unit includes memory, a processor, a logic stored in the memory that, when executed by the processor, causes the slave unit to perform a method. The method includes receiving a command from a master unit 30; changing a state of an operational component 32 via actuating a control mechanism of the slave unit upon receipt of the command, if the amount of time between receiving commands 31 exceeds a preset limit; communicating a confirmation message to the master unit 33. The operational component of a vehicle is selected from the following group consisting of a fuel valve, an ignition system, an engine starter, a door locking system, a horn system, and a light system. The confirmation message 33 includes information about the state of the operational component. For example, if the amount of time between receiving commands 31 does not exceed a preset limit, then the confirmation message includes information that the state of the operational component has not been changed.

Figure 5:
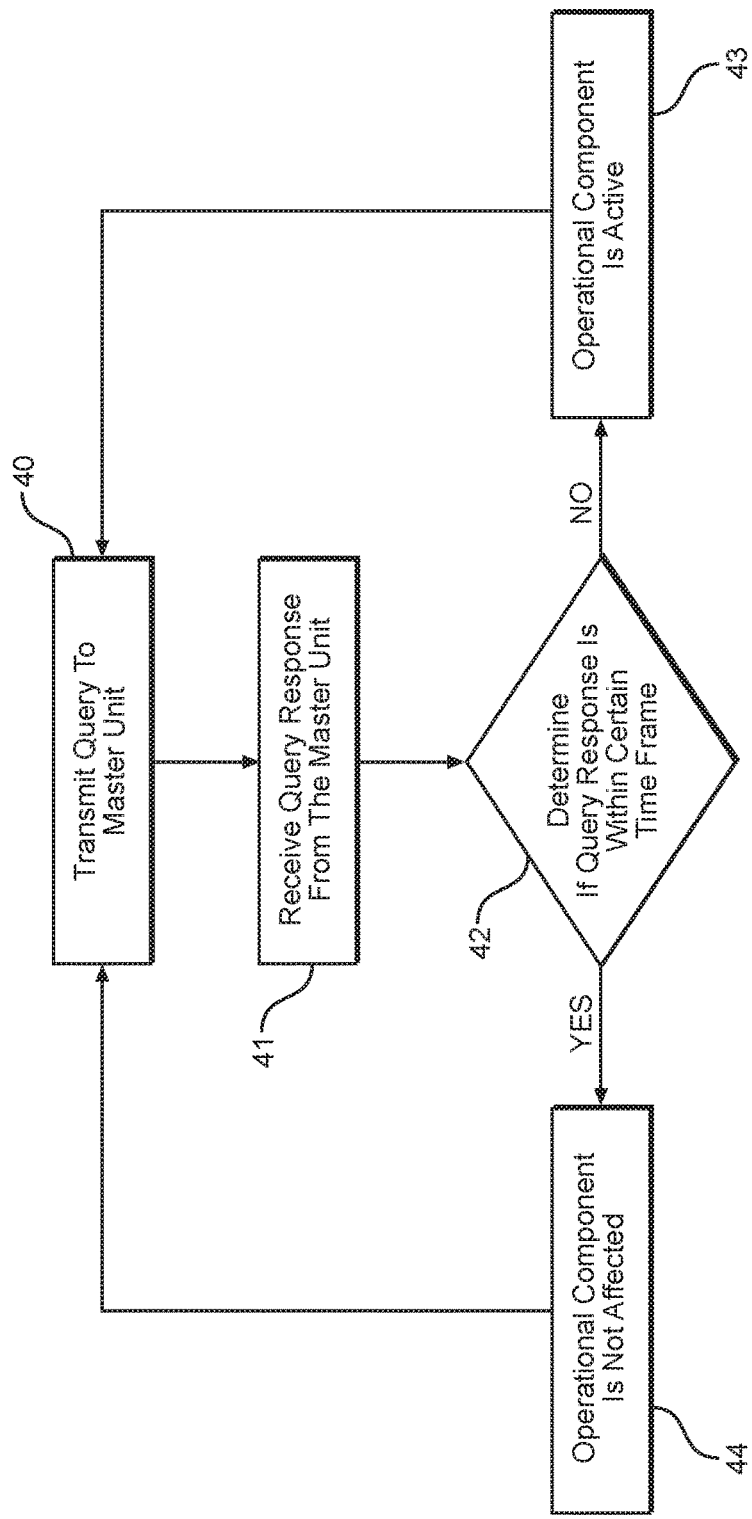
FIG. 5 shows a flowchart of the method of messaging of an illustrative embodiment of the present system.

Referring now to FIG. 5, there is shown a flowchart of the method of monitoring an illustrative embodiment of the present system. The present invention maintains a wireless connection between the slave unit and master unit via a system and method of monitoring the wireless connection. One method of monitoring the present system includes transmitting a query message to the master unit 40; receiving a query response from the master unit 41; determining the amount of time between transmitting the query message and receiving the query response 42; wherein if the amount of time exceeds a preset limit, then the state of the operational component is inactive 43, and if the amount of time does not exceeds a preset limit, then do not affect the state of the operational 44. In one embodiment, the time frame between transmission query 40 and query response 41 is between 0 to 45 seconds. However, in alternative embodiments, the time frame may be longer.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A remote vehicle disabling system comprising:
    a slave unit configured to receive instructions from a master unit via a wireless communication network, the master unit comprising a trigger unit;
    the slave unit operably connectable to an operational component of a vehicle;
    wherein the slave unit is configured to change a state of the operational component;
    wherein the operational component of a vehicle is selected from the following group consisting of a fuel valve, an ignition system, an engine starter, a door locking system, a horn system, and a light system;
    the disabling system further comprising a memory, a processor, a logic stored in the memory that, when executed by the processor, causes the slave unit to perform a method comprising the steps of:
        receiving a command from the master unit;
        changing the state of the operational component via actuating the slave unit upon receipt of the command;
        transmitting a confirmation message to the master unit upon changing the state of the operational component of the vehicle;
    wherein the operational component is electrically connected to a negative terminal of a power source;
    an ignition relay switch electrically connected to a positive terminal of the power source and operably connected to the slave unit; and
    a bypass switch operably connected to the slave unit, wherein the bypass switch is configured to override the slave unit and allow activation of the operational component.

2. The remote vehicle disabling system of claim 1, wherein the wireless communication network comprises a telecommunications network.

3. The remote vehicle disabling system of claim 1, wherein the fuel valve includes a solenoid valve configured to regulate fuel to an engine of the vehicle.

4. The remote vehicle disabling system of claim 1, wherein the engine starter includes a starter motor configured to control the activation of the engine.

5. The remote vehicle disabling system of claim 1, wherein:
    the operational component is electrically connected to the positive terminal of the power source; and
    the engine starter is electrically connected to the negative terminal of the power source and operably connected to the slave unit.

6. The remote vehicle disabling system of claim 1, wherein the door locking system includes a locking mechanism operably connected to at least one door of the vehicle.

7. The remote vehicle disabling system of claim 1, wherein the horn system includes a sound making device operably connected to the vehicle.

8. The remote vehicle disabling system of claim 1, wherein the light system includes lighting devices operably connected to the vehicle.

* * * * *